(12) United States Patent
Chin et al.

(10) Patent No.: US 12,521,487 B2
(45) Date of Patent: Jan. 13, 2026

(54) SYRINGE FOR DERMAL REGENERATION

(71) Applicants: Se Hoon Chin, Seongnam-si (KR); Kyung Suk Jin, Incheon (KR)

(72) Inventors: Se Hoon Chin, Seongnam-si (KR); Kyung Suk Jin, Incheon (KR)

(*) Notice: Subject to any disclaimer, the term of this patent is extended or adjusted under 35 U.S.C. 154(b) by 708 days.

(21) Appl. No.: 17/906,671

(22) PCT Filed: Mar. 23, 2021

(86) PCT No.: PCT/KR2021/003595
§ 371 (c)(1),
(2) Date: Sep. 19, 2022

(87) PCT Pub. No.: WO2021/194232
PCT Pub. Date: Sep. 30, 2021

(65) Prior Publication Data
US 2023/0158236 A1    May 25, 2023

(30) Foreign Application Priority Data
Mar. 25, 2020 (KR) .......................... 10-2020-0036258

(51) Int. Cl.
*A61M 5/178*  (2006.01)
*A61M 5/31*   (2006.01)
*A61M 5/32*   (2006.01)

(52) U.S. Cl.
CPC ........ *A61M 5/1782* (2013.01); *A61M 5/3286* (2013.01); *A61M 2005/3131* (2013.01); *A61M 2210/04* (2013.01)

(58) Field of Classification Search
CPC .............. A61M 5/1782; A61M 5/3286; A61M 2005/3131; A61M 2210/04;
(Continued)

(56) References Cited

U.S. PATENT DOCUMENTS
2017/0056594 A1    3/2017 Chin

FOREIGN PATENT DOCUMENTS
CN    206543305 U    10/2017
JP    S60-043243 A    3/1985
(Continued)

OTHER PUBLICATIONS

Notice of Allowance dated Sep. 29, 2022 in Korean Application No. 10-2020-0036258.
(Continued)

*Primary Examiner* — Theodore J Stigell
(74) *Attorney, Agent, or Firm* — Knobbe, Martens, Olson & Bear, LLP (57) ABSTRACT

A syringe for dermal regeneration comprises a body comprising inner and outer tubes, a cylinder filled with a first fluid being inserted into the inner tube from behind, and the outer tube being spaced apart from the inner tube and shaped to surround the inner tube such that a fillable space is formed between the inner tube and the outer tube and is filled with a second fluid; an injector coupled to the front portion of the body, the injector comprising a first part, a second part, and a third part; a through-hole formed through one side of the second part of the injector so as to communicate with the fillable space; and a check valve provided in the through-hole so as to block a flow of fluid from the injector to the fillable space and to allow a flow of fluid from the fillable space to the injector.

14 Claims, 5 Drawing Sheets

(58) Field of Classification Search
CPC .. A61M 2005/3128; A61M 5/30; A61M 5/19; A61M 5/24; A61M 5/31; A61M 5/32; A61M 5/3298; A61M 5/2448; A61M 5/3129; A61M 5/3294; A61M 2005/3103; A61M 5/2066
See application file for complete search history.

(56) References Cited

FOREIGN PATENT DOCUMENTS

| | | | |
|---|---|---|---|
| JP | 2013-180004 A | | 9/2013 |
| JP | 2016-005543 A | | 1/2016 |
| KR | 20-1999-0028444 U | | 7/1999 |
| KR | 10-1491576 B1 | | 2/2015 |
| KR | 10-1685660 B1 | | 12/2016 |
| KR | 10-1759272 B1 | | 7/2017 |
| KR | 10-1879211 B1 | | 7/2018 |
| KR | 10-2018-0100912 A | * | 9/2018 |
| KR | 10-2020-0035636 A | | 4/2020 |

OTHER PUBLICATIONS

Notice of Allowance in Chinese Patent Application No. 202180023530.6 issued on May 31, 2024, 6 pages.
Notice of Allowance dated Jul. 11, 2023 in Japanese Application No. 2022-558212.
Search Report in Application No. PCT/KR2021/003595 issued on Jul. 1, 2021.

* cited by examiner

SYRINGE FOR DERMAL REGENERATION

TECHNICAL FIELD

The present invention relates to a syringe for dermal regeneration in which a sloping surface is formed in an injector positioned outside a body, the fusion surface of the body and the injector is configured as a flat surface, and the injector includes a recessed portion formed to be recessed in the vertical direction, so that it is convenient and easy to be manufactured.

BACKGROUND ART

The skin consists of the dermis and the epidermis. The dermis is the skin beneath the epidermis and consists of collagen, elastin, and matrix proteins that control the elasticity of the skin. As aging progresses, cell regeneration in the dermis layer is delayed, and the production of hyaluronic acid is delayed, causing the fibers related to skin elasticity to break or lose elasticity. Therefore, regeneration of damaged dermis can be the core of skin care.

In the case of retracted scars and deep wrinkles that are difficult to treat, a minute amount of gas is first injected into the dermal layer to split the dermal layer, and a small amount of liquid is injected into the torn dermal layer to cause physical, chemical, and biological stimuli at the same time. Treatment is possible by inducing a large amount of collagen fibrous tissue to be produced at the desired point. Thus, a treatment for the retracted scar and the deep wrinkle is possible by generating a large amount of collagen fibrous tissue at a determined point.

Therefore, in order to achieve self-dermal regeneration, there is a need to alternately inject a gas and a liquid in a state where a needle of one syringe invades the skin. To this end, a syringe with a special structure has been required.

In particular, in the case of a syringe for dermal regeneration, a separate gas connection mechanism was required for gas injection, but when a separate device was combined, the volume of the system increased and production and distribution were not easy. Thus, it was necessary to have a syringe that could be distributed with only one relatively simple syringe, and that it could be simply disposed of after use to provide a simple treatment method.

In the case of the conventionally developed syringe, it includes an injector having a sloping surface to facilitate needle invasion, but the fusion surface of the body and the injector becomes a tapered sloping surface, making it difficult to manufacture. In addition, there was a problem in that non-uniform shrinkage occurred during the molding and injection process, resulting in defective products.

The matters described as the background art above are only for improving the understanding of the background of the present invention, and should not be taken as acknowledging that they correspond to the prior art already known to those of ordinary skill in the art.

DISCLOSURE

Technical Tasks

The present invention has been proposed to solve this problem, and the present invention provides a syringe in which a sloping surface is formed on an injector to facility invasion, the fusion surface between the injector and the body is composed of a flat surface rather than a sloping surface, and the injector includes a recessed portion, so that the shrinkage phenomenon is prevented during injection molding, and the manufacturing is easy and mass production is possible, and the sloping surface of the needle is configured to invade upward, so that the treatment solution can be effectively injected between the dermis and the epidermis of the retracted area.

Technical Solution

In order to achieve the above object, the present invention provides a syringe for dermal regeneration, including a body comprising an inner tube and an outer tube, a cylinder filled with a first fluid being inserted into the inner tube from behind, and the outer tube being spaced apart from the inner tube and shaped to surround the inner tube such that a fillable space is formed between the inner tube and the outer tube and is filled with a second fluid; an injector coupled to a front portion of the body and configured to comprise a first part, a second part, and a third part, the first part being positioned outside the body, having a front end coupled to a needle, having a rear end being sealed while contacting the outer tube, and having a sloping surface formed on a side portion so as to slope toward a center from the rear end to the front end, the second part being inserted into the body and sealed while contacting the inner tube, and the third part being connected to the cylinder and sealed; a through-hole formed through one side of the second part of the injector so as to communicate with the fillable space such that the second fluid flows into the injector through the second part; and a check valve provided in the through-hole so as to block a flow of fluid from the injector to the fillable space and to allow a flow of fluid from the fillable space to the injector.

The injector may be made of a plastic material, and include a recessed portion formed to be recessed in a vertical direction from the sloping surface of the first part to the second part.

A plurality of the recessed portions may be spaced apart from each other by a predetermined interval.

The recessed portions may be formed to extend from the sloping surface of the first part to an inside of the second part, and the recessed portions adjacent to an upper portion of the through-hole may be formed to extend to the upper portion of the through-hole.

At a center of the first part of the injector, a needle coupling hole that is coupled with a rear end of the needle and is a flow path through which the fluids flow into the needle is formed, and an inner space through which the fluids flow is formed in the second and third parts, one end of the inner space communicates with the cylinder and the other end of the inner space communicates with the needle coupling hole, so that the fluids may flow out into the needle through the inner space.

A screw thread may be formed on an inner circumferential surface of the cylinder, and a protruding portion may be formed to protrude at an end of the third part to be screwed with the cylinder.

In the through-hole, a connection portion through which the fluids flow in and out may be formed at a lower end of a passage where the through-hole and the injector communicate, and the connection portion may be formed adjacent to an end where the inner space and the needle coupling hole communicate.

In addition, the syringe may further include an O-ring seal provided in the injector to prevent the fluids from leaking.

The O-ring seal may be provided at a connection point between the second part and the inner tube to prevent the first fluid from leaking from the cylinder.

In addition, the rear end of the first part may be formed with a coupling end formed to be stepped with the second part, and an outer wall of the outer tube may be sealed in contact with the coupling end.

In addition, the second part may be configured to comprise a second-1 part connected to the first part and a second-2 part that is connected to the third part and has a smaller diameter than a diameter of the second-1 part, and when the second part is inserted in the body, an outer circumferential surface of the second-1 part may be sealed in contact with an inner circumferential surface of the outer tube, and an outer circumferential surface of the second-2 part may be sealed in contact with an inner circumferential surface of the inner tube.

In addition, the syringe may further include a gas inlet penetrating a side wall of the body and communicating with the fillable space so that the first fluid is filled into the fillable space.

In addition, a guide portion may be formed on a sidewall of the body.

A front end of the needle may include a cut surface that is cut obliquely in one direction, and the cut surface may be formed to face upward while the body is coupled to an actuator.

Advantageous Effect

In the present invention, since the sloping surface is formed on the injector, the needle is easy to invade and thus the treatment is easy. The fusion surface of the injector and the body is made of a flat surface, so that the fusion is easy, and it is easy to manufacture.

In addition, the recessed portion is formed in the injector, so there is an effect of stably mass-producing by preventing a shrinkage phenomenon caused by a non-uniform solidification rate during molding injection production.

In addition, the needle has a cut surface that is obliquely cut, and the cut surface faces upward during invasion, which has the effect of effectively injecting fluid into the retracted scar.

MODE FOR INVENTION

The present invention may include a body including an inner tube and an outer tube, a cylinder filled with a first fluid being inserted into the inner tube from behind, and the outer tube being spaced apart from the inner tube and shaped to surround the inner tube such that a fillable space is formed between the inner tube and the outer tube and is filled with a second fluid; an injector coupled to the front portion of the body, the injector including a first part, a second part, and a third part, the first part being positioned outside the body, having a front end coupled to a needle, having a rear end being sealed while contacting the outer tube, and having a sloping surface formed on a side portion so as to slope toward the center from the rear end to the front end, the second part being inserted into the body and sealed while contacting the inner tube, and the third part being connected to the cylinder and sealed; a through-hole formed through one side of the second part of the injector so as to communicate with the fillable space such that the second fluid flows into the injector through the second part; and a check valve provided in the through-hole so as to block a flow of fluid from the injector to the fillable space and to allow a flow of fluid from the fillable space to the injector.

Embodiments of the Present Invention

Embodiments of the present invention, which are disclosed in the present specification or application, will be described for illustrative purpose in terms of specific structures and functions. The embodiments of the present invention can be implemented in various ways, and the present invention should not be construed as being limited to the embodiments that are described in the present specification or application.

Various modifications may be made in various ways to the embodiments of the present invention. The embodiments of the present invention may have various forms. Therefore, embodiments will be described in detail in the present specification or application with reference to the accompanying drawings. However, this description is not intended to limit the technical idea of the present invention to the specifically disclosed embodiments. All alterations, equivalents, and substitutes that are included within the technical idea of the present invention should be understood as falling within the scope of the present invention.

The terms first, second, and so on are used to describe various constituent elements but should not be construed as imposing any limitation on the various constituent elements. Those terms are only used to distinguish one constituent element from another. For instance, a first constituent element may be termed a second constituent element without departing from the scope of each claim that defines the present invention. Likewise, the second constituent element may also be termed the first constituent element.

Hereinafter, the present invention will be described in detail by describing embodiments of the present invention with reference to the accompanying drawings. Like reference numerals in each figure indicate like elements.

In the self-dermal regeneration, a gas such as carbon dioxide is first injected to separate the epidermis and the dermal layer, then a space is formed, and a skin regeneration accelerator such as hyaluronic acid is injected into the space to promote the regeneration of the dermis, thereby treating retracted scars, wrinkles, and the like. In this process, it is necessary to repeatedly/alternately inject two different fluids. Therefore, it may be considered to be provided with two syringes for this purpose, but in this case, there is a hassle of continuously replacing the syringe, and thus the present invention has been developed to easily implement it.

Figure 1:
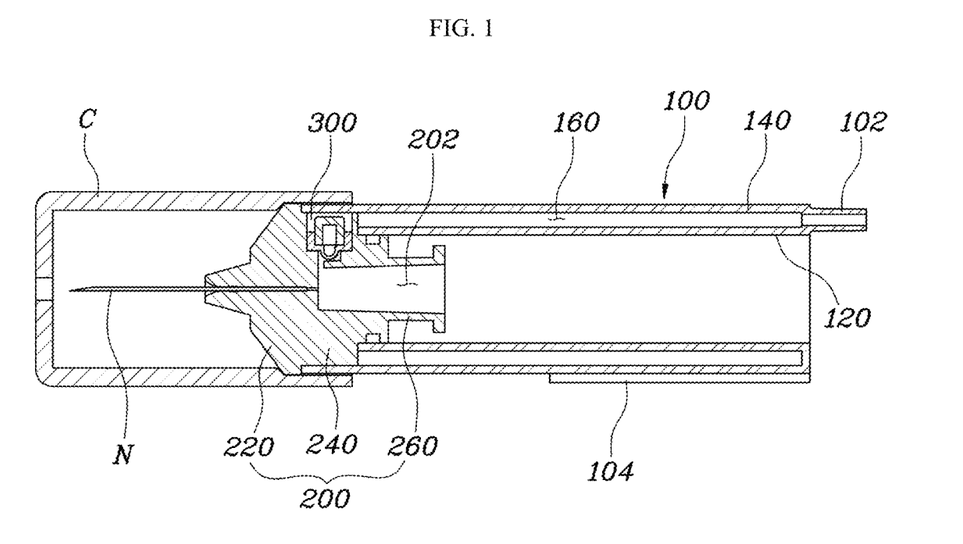
FIG. 1 is a cross-sectional view of a side of a syringe for dermal regeneration according to an embodiment of the present invention.

FIG. 1 is a cross-sectional view of a side of a syringe for dermal regeneration according to an embodiment of the present invention. Referring to FIG. 1, a syringe for dermal regeneration according to an embodiment of the present invention may be configured to include a body 100, an injector 200, a through-hole 300, and a check valve 400. The front portion of the syringe in which a needle (N) is formed can be covered with a cap (C) for storage.

The body 100 may have a cylindrical shape, and may be composed of an inner tube 120 and an outer tube 140. A cylinder (not shown) filled with a first fluid may be inserted and coupled to the inner tube 120 from behind. The first fluid filled in the cylinder may flow out into the needle (N) through an inner space 202 of the injector 200 to be described later.

The outer tube 140 may be spaced apart from the inner tube 120 by a predetermined interval to surround the inner tube 120. That is, the diameter of the outer tube 140 is formed larger than the diameter of the inner tube 120. A Tillable space 160 in which a second fluid is filled may be formed in a space in which the inner tube 120 and the outer tube 140 are spaced apart. Further, the length of the inner tube 120 is formed shorter than the length of the outer tube 140, a second part 240 is inserted into the space formed by the difference in length. A portion of the second part 240 may be sealed in contact with the inner circumferential surface of the outer tube 140, and the remaining portion may be sealed in contact with the inner circumferential surface of the inner tube 120.

The injector 200 may be coupled to the front portion of the body 100 to form a passage through which the first fluid and the second fluid flow. Referring to FIG. 1, the injector 200 is configured to include a first part 220, a second part 240, and a third part 260.

The first part 220 is positioned on the outside of the body 100, the front end of the first part is coupled to the needle (N) and the rear end of the first part is sealed in contact with the outer tube 140. A side portion of the first part 220 may have a sloping surface sloped toward the center from the rear end to the front end. The sloping surface facilitates invasion into human skin when a syringe for dermal regeneration is used.

When the needle (N) invades the skin, it is inserted while forming a sloping angle that is obliquely sloped rather than perpendicular to the skin. The sloping surface can be supported in contact with the upper surface of the skin, and the injector 200 is not interfered with by the skin, so that it can be invaded to a sufficient depth with the needle (N) of a relatively short length.

The second part 240 may be connected to the rear end of the first part 220, inserted into the body 100, and sealed in contact with the inner tube 120. The second part 240 is inserted into the space formed by the difference in length between the outer tube 140 and the inner tube 120 to be in contact with the inner tube 120.

The third part 260 may be connected to the rear end of the second part 240, and may be connected to the cylinder and sealed. The third part 260 is inserted into the inner tube 120 and is connected to the cylinder filled with the first fluid. Then, the end of the third part 260 may be inserted into and connected to the cylinder.

In the case of a conventional syringe for dermal regeneration, even if it includes a sloping surface, the body 100 and the sloping surface are configured to be fusion-bonded. When the contact surface is a tapered sloping surface, there is a problem in that it is difficult to weld and to manufacture, and the stability is also deteriorated.

However, in the present invention, the first part 220 is positioned outside the body 100, and the second part 240 and the third part 260 are inserted into the body 100. Therefore, the fastening portion of the body 100 and the injector 200 becomes the rear end of the first part 220, and the cross-section of the fastening portion is formed in a flat surface. That is, the sloping surface and the body 100 are not fused, but the flat surface and the body 100 are fused, and the sloping surface is positioned on the upper portion of the fused portion, so that manufacturing is easy and the effect of the sloping surface can be simultaneously obtained.

Referring to FIG. 1, the diameter of the first part 220 is the largest, then the diameter of the second part 240 is large, and the diameter of the third part 260 is the smallest. Since the first part 220 is exposed to the outside of the body 100 in contact with the outer tube 140, the largest diameter is formed in the first part. Since the second part 240 is in contact with the inner tube 120 between the outer tube 140 and the inner tube 120, it should be formed smaller than the diameter of the first part 220 and larger than the diameter of the inner tube 120.

Since the third part 260 is inserted into the inner tube 120 and connected to the cylinder, the diameter of the third part 260 is smaller than the diameter of the inner tube 120.

The through-hole 300 may function to communicate the fillable space 160 and the inside of the injector 200. The through-hole 300 may be formed on one side of the second part 240 of the injector 200 to communicate with the fillable space 160. Accordingly, in the fillable space 160, the second fluid may be introduced into the injector 200 through the through-hole 300.

The check valve 400 is a valve that allows the fluid to flow in only one direction and blocks it from flowing in the opposite direction. The check valve 400 is provided in the through-hole 300 to allow the second fluid to flow from the fillable space 160 to the inside of the injector 200, and to block the flow of the first fluid or the second fluid from the inside of the injector 200 to the fillable space 160.

Figure 2:
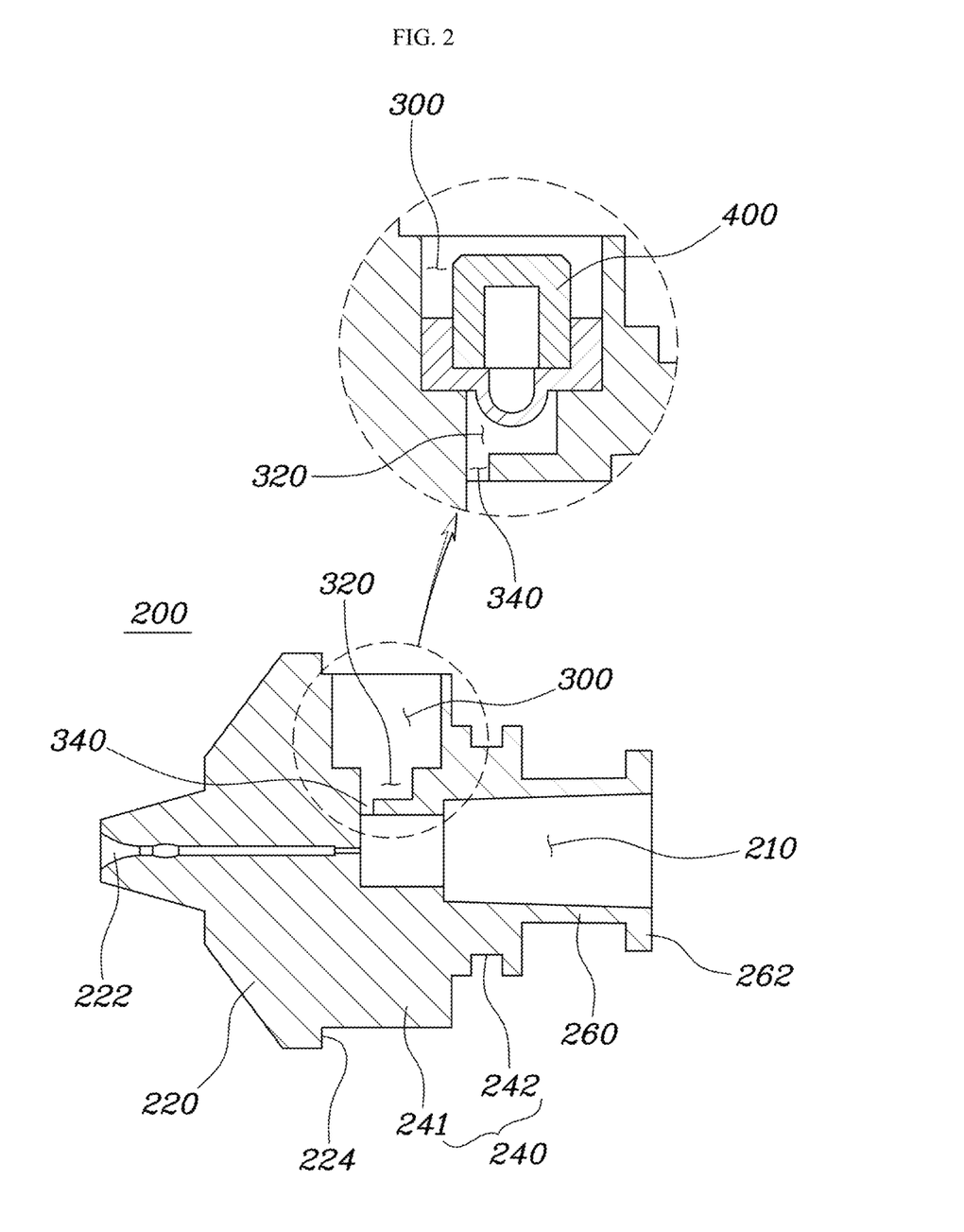
FIG. 2 is a cross-sectional view of a side of an injector of a syringe for dermal regeneration according to an embodiment of the present invention.

FIG. 2 is a cross-sectional view of the side of the injector 200 of a syringe for dermal regeneration according to an embodiment of the present invention.

Figure 3:
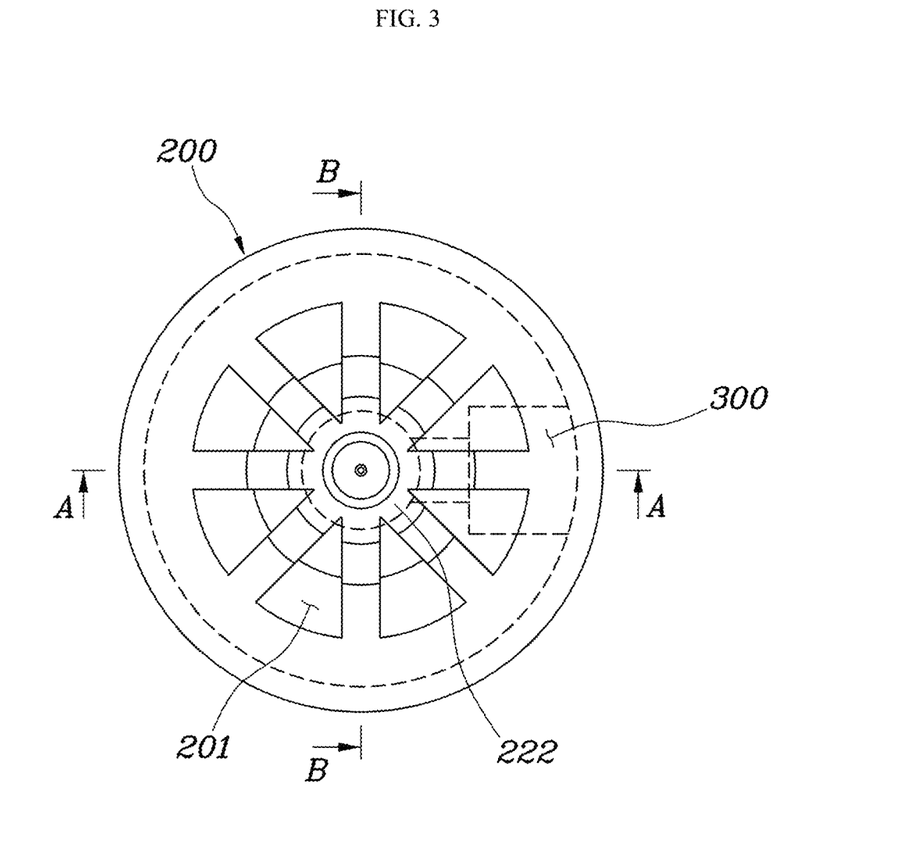
FIG. 3 is a front view of an injector of a syringe for dermal regeneration according to an embodiment of the present invention.
Figure 4:
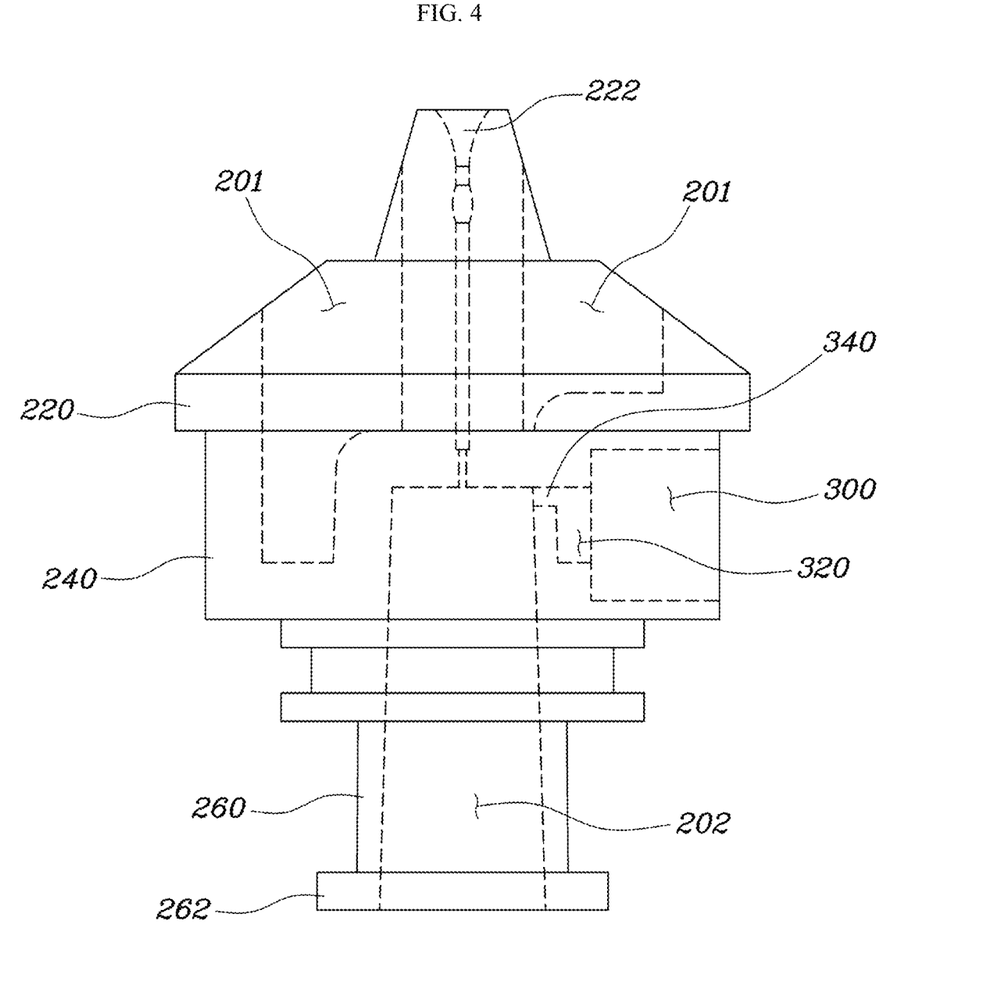
FIG. 4 is a cross-sectional view taken along area A-A of FIG. 3.
Figure 5:
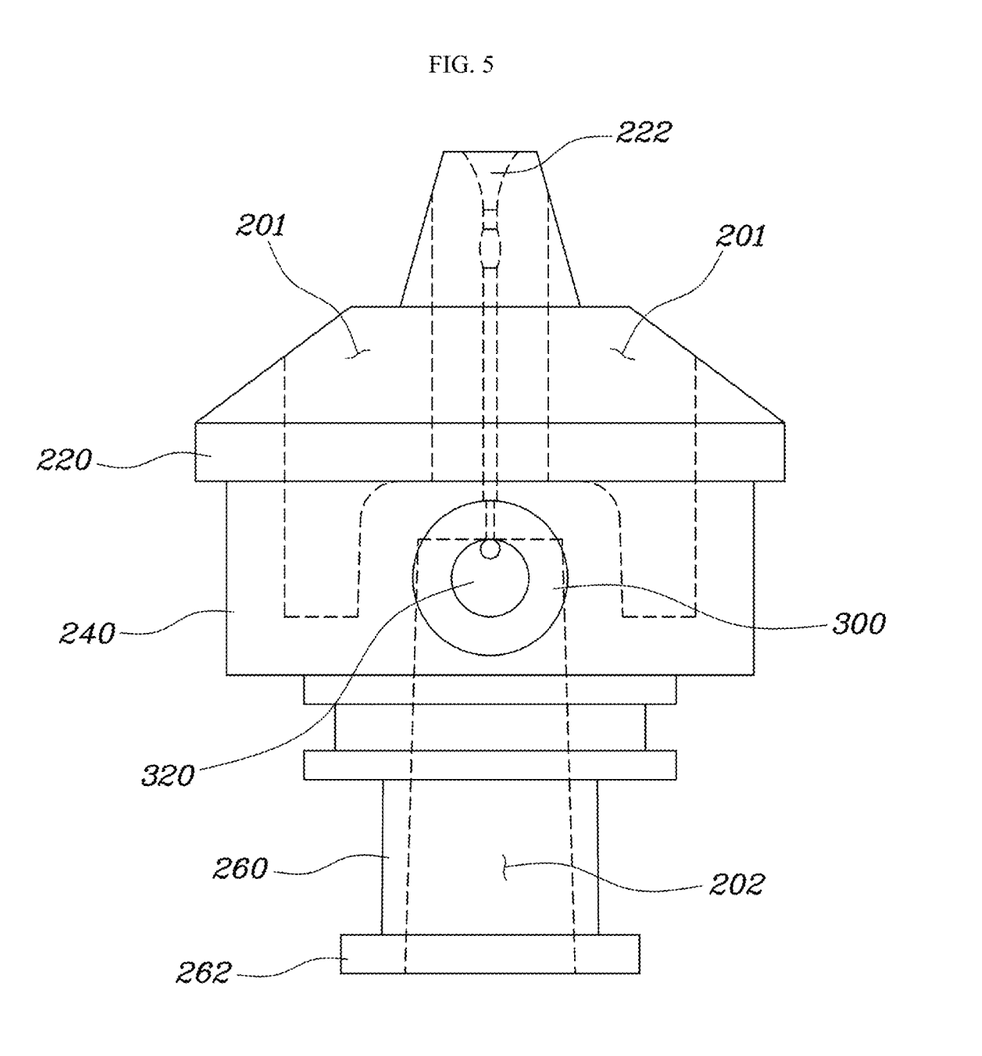
FIG. 5 is a cross-sectional view taken along area B-B of FIG. 3.

FIG. 3 is a front view of the injector 200 of a syringe for dermal regeneration according to an embodiment of the present invention, FIG. 4 is a cross-sectional view of area A-A of FIG. 3, FIG. 5 is a cross-sectional view of area B-B of FIG. 3.

Referring to FIGS. 3 to 5, a recessed portion 201 may be formed in the injector 200 of the syringe for dermal regeneration according to an embodiment of the present invention. The recessed portion 201 may be recessed in the vertical direction from the sloping surface of the first part 220 of the second part 240 in the injector 200. The vertical direction refers to a direction toward the front and rear of the injector 200.

The injector 200 may be made of a plastic material. In general, in the case of an injection molding made of a plastic material, it is manufactured by putting the material in a mold and molding it at high temperature and high pressure. However, even if it is possible to manufacture a mold, there are cases in which it is difficult to manufacture by injection molding. This is because the high-temperature product taken out of the mold is deformed at room temperature. The edge or surface in contact with air cools and solidifies relatively quickly, but the central portion of the product cools slowly because it does not come into contact with air. There is a problem in that the slowly cooled portion over time shrinks more than the fast cooled portion.

In order to prevent such a shrinkage phenomenon, the solidification rate should be made the same or similar in all respects. Thus, the recessed portion 201 formed in the injector 200 is a kind of coring in order to solve such a problem and may perform a function of stably solidifying the injector 200. Through the recessed portion 201, not only the outer surface of the injector 200 but also the inner surface of the injector 200 can be solidified at a constant speed by contacting air, so that manufacturing is easy and the production of defective products in mass production can be reduced.

Referring to FIG. 3, a plurality of recessed portions 201 may be formed. The recessed portions 201 may be formed to surround the center of the injector 200 and spaced apart from each other at predetermined intervals. The shapes of the recessed portions 201 are preferably formed to be uniform, respectively. The plurality of recessed portions 201 is formed, spaced apart from each other by a predetermined interval, and all of the recessed portions 201 are formed in the same shape, so that the injector 200 can be stably solidified during molding and injecting. On the other hand, since the rigidity of the product may be reduced by the formation of the recessed portions 201, the rigidity may be maintained by forming the recessed portions spaced apart from each other by a predetermined interval.

Referring to FIGS. 4 and 5, the recessed portions 201 may be formed to extend from the sloping surface of the first part 220 to the inside of the second part 240. However, the recessed portion 201 adjacent to the upper portion of the through-hole 300 may be formed to extend only to the upper portion of the through-hole 300. This is because when the through-hole 300 and the recessed portion 201 overlap, the fluid flows out.

Referring to FIGS. 4 and 5, a needle coupling hole 222 that is coupled to the rear end of the needle (N) and is a flow path through which the fluid flows into the needle (N) may be formed at the center of the first part 220 of the injector 200. An inner space 202 through which a fluid may flow may be formed in the second part 240 and the third part 260. The inner space 202 and the needle coupling hole 222 may be formed to communicate with each other.

One end of the inner space 202 may communicate with the cylinder, and the other end of the inner space may communicate with the needle coupling hole 222. The fluid flows into the inner space 202 and flows into the needle (N) through the needle coupling hole 222 and then flows out by the needle (N).

A protrusion portion 262 protruding outwardly may be formed at an end of the third part 260. A screw thread may be formed on the inner circumferential surface of the portion connected to the third part 260 of the cylinder, and the protrusion portion 262 may be connected to the screw thread so that the cylinder and the third part 260 are screwed together to be firmly sealed. There is an effect that the first fluid filled in the cylinder does not leak by the screwing coupling and flows into the injector 200.

FIG. 2 is a cross-sectional view of the side of the injector 200 of a syringe for dermal regeneration according to an embodiment of the present invention.

Referring to FIG. 2, the through-hole 300 may be formed so as to be adjacent to the end at which the inner space 202 and the needle coupling hole 222 communicate. In the case of the syringe for dermal regeneration, the first fluid and the second fluid are alternately injected, so that positive and negative pressures are repeatedly applied. In the case of injecting the second fluid, the second fluid must be introduced into the inner space 202 through the fillable space 160. However, when the first fluid remains in the inner space 202, a problem in which the first fluid is injected first may occur.

In order to solve the above problem, the through-hole 300 may be formed with a connection portion 340 through which the fluid flows in and out at the lower end of a passage 320 communicating with the injector 200. The connection portion 340 is formed adjacent to the end at which the inner space 202 and the needle coupling hole 222 communicate, and it is configured that the second fluid is introduced into the needle coupling hole 222 immediately after being introduced into the inner space 202 through the connection portion 340. Accordingly, in the case of injecting the second fluid, it is possible to solve the problem that the first fluid remaining in the inner space 202 is injected first.

In addition, the syringe for dermal regeneration according to an embodiment of the present invention may further include an O-ring seal (not shown). The O-ring seal may be provided in the injector 200 to seal the inner space 202 to prevent fluid leakage. The O-ring seal may be formed in a ring shape. The O-ring seal may be provided at the connection point between the second part 240 and the inner tube 120 to prevent the first fluid from leaking from the cylinder.

Referring to FIG. 2, a coupling end 224 formed to be stepped with the second part 240 may be formed at the rear end of the first part 220. When the injector 200 and the body 100 are coupled to each other, the outer wall of the outer tube 140 may be sealed in contact with the coupling end 224. In the coupling end 224, when the coupling end 224 and the body 100 are fused, the fillable space 160 may be sealed. Since the body 100 is fused to the coupling end 224, there is an effect of easy manufacturing as described above.

Also, the second part 240 may be configured to include a second-1 part 241 and a second-2 part 242. Referring to FIG. 2, the second-1 part 241 may be connected to the first part 220, and the second-2 part 242 may be connected to the third part 260. The diameter of the second-2 part 242 is smaller than the diameter of the second-1 part 241. When the second part 240 is inserted into the body 100, the outer circumferential surface of the second-1 part 241 is sealed in contact with the inner circumferential surface of the outer tube 140, and the outer circumferential surface of the second-2 part 242 may be sealed in contact with the inner circumferential surface of the inner tube 120.

In addition, a gas inlet 102 through which the first fluid flows into the fillable space 160 may be formed on the sidewall of the body 100. The gas inlet 102 may pass through the sidewall of the body 100 and communicate with the fillable space 160 between the inner tube 120 and the outer tube 140 so that the first fluid may be filled into the fillable space 160. When a separate device for supplying the first fluid is connected to the gas inlet 102, the fillable space 160 is filled with the first fluid, so there is an advantage that an operator can perform the procedure without checking the amount of the first fluid filled in the fillable space 160 every time.

In addition, a guide portion 104 may be formed on the sidewall of the body 100. The guide portion 104 may be formed by repeatedly forming a plurality of grooves and protrusions. The syringe for dermal regeneration may be connected to a device such as a separate actuator (not shown) for driving the piston provided in the cylinder to electronically control the driving of the piston. In this case, the guide portion 104 may be coupled to and fixed to the housing of the actuator. That is, the guide portion 104 may guide the position of the actuator that drives the piston inserted into the cylinder, or may guide a connection line connected to the actuator.

In addition, the front end of the needle (N) may be formed with a cut surface that is cut obliquely in one direction. The cut surface may be formed to face upward while the body 100 is coupled to the actuator.

The retracted scars are treated by injecting a fluid such as a treatment solution between the dermis and the epidermis because the surface of the skin is retracted. However, in order to regenerate the inner surface of the skin to the outside, it is necessary to inject a treatment solution into the epidermis between the dermis and the epidermis of the retracted area. Therefore, by configuring the cut surface of the needle (N) to face upward, the treatment solution is diffused toward the epidermis to increase the treatment effect.

According to the syringe for dermal regeneration according to an embodiment of the present invention, the dermis inside the skin can be easily regenerated by selectively injecting a gas such as carbon dioxide and a treatment solution such as hyaluronic acid, and the configuration of syringe is simple, so it is very convenient to manufacture and use the syringe.

In particular, the portion where the sloping surface and the body 100 are fused is made of a flat surface rather than a tapered sloping surface, so that the fusion is easy, so the syringe can be easy to manufacture and stably use. In addition, the recessed portions 201 are formed to prevent a phenomenon that the shape is distorted or contracted by cooling during injection manufacturing, thereby making it easy to manufacture.

In addition, there is an advantage that the treatment effect can be increased because the fluid can be effectively spread to the retracted area by being invaded with the sloping surface of the needle (N) facing upward.

The embodiments of the present invention are illustrated and described, and it would be obvious to a person of ordinary skill in the art that various modifications and alterations are possibly made to the present invention without departing from the technical idea of the present invention that is claimed in the following claims.

INDUSTRIAL APPLICABILITY

The present invention relates to an invention related to a syringe for dermal regeneration in which the sloping surface is formed on the injector positioned outside the body, the fusion surface of the body and the injector is configured as a flat surface, and the injector includes the recessed portion formed by being recessed in the vertical direction, so it is convenient to use and easy to manufacture.

The invention claimed is:

1. A syringe for dermal regeneration, comprising:
a body comprising an inner tube and an outer tube, a cylinder filled with a first fluid being inserted into the inner tube from behind, and the outer tube being spaced apart from the inner tube and shaped to surround the inner tube such that a fillable space is formed between the inner tube and the outer tube and is filled with a second fluid;
an injector coupled to a front portion of the body and configured to comprise a first part, a second part, and a third part, the first part being positioned outside the body, having a front end coupled to a needle, having a rear end being sealed while contacting the outer tube, and having a sloping surface formed on a side portion so as to slope toward a center from the rear end to the front end, the second part being inserted into the body and sealed while contacting the inner tube, and the third part being connected to the cylinder and sealed;
a through-hole formed through one side of the second part of the injector so as to communicate with the fillable space such that the second fluid flows into the injector through the second part; and
a check valve provided in the through-hole so as to block a flow of fluid from the injector to the fillable space and to allow a flow of fluid from the fillable space to the injector.

2. The syringe according to claim 1, wherein the injector is made of a plastic material, and comprises a recessed portion formed to be recessed in a vertical direction from the sloping surface of the first part to the second part.

3. The syringe according to claim 2, wherein the recessed portion comprises a plurality of recessed portions that are spaced apart from each other by a predetermined interval.

4. The syringe according to claim 3, wherein the plurality of recessed portions are formed to extend from the sloping surface of the first part to an inside of the second part, and recessed portions of the plurality of recessed portions adjacent to an upper portion of the through-hole are formed to extend to the upper portion of the through-hole.

5. The syringe according to claim 1, wherein at a center of the first part of the injector, a needle coupling hole that is coupled with a rear end of the needle and is a flow path through which the fluids flow into the needle is formed, and an inner space through which the fluids flow is formed in the second and third parts, one end of the inner space communicates with the cylinder and an opposite end of the inner space communicates with the needle coupling hole, so that the fluids flow out into the needle through the inner space.

6. The syringe according to claim 5, wherein a screw thread is formed on an inner circumferential surface of the cylinder, and a protruding portion is formed to protrude at an end of the third part to be screwed with the cylinder.

7. The syringe according to claim 5, wherein in the through-hole, a connection portion through which the fluids flow in and out is formed at a lower end of a passage where the through-hole and the injector communicate, and the connection portion is formed adjacent to the opposite end where the inner space and the needle coupling hole communicate.

8. The syringe according to claim 1, further comprising an O-ring seal provided in the injector to prevent the fluids from leaking.

9. The syringe according to claim 8, wherein the O-ring seal is provided at a connection point between the second part and the inner tube to prevent the first fluid from leaking from the cylinder.

10. The syringe according to claim 1, wherein the rear end of the first part is formed with a coupling end formed to be stepped with the second part, and an outer wall of the outer tube is sealed in contact with the coupling end.

11. The syringe according to claim 1, wherein the second part is configured to comprise a second-1 part connected to the first part and a second-2 part that is connected to the third part and has a smaller diameter than a diameter of the second-1 part, and when the second part is inserted in the body, an outer circumferential surface of the second-1 part is sealed in contact with an inner circumferential surface of the outer tube, and an outer circumferential surface of the second-2 part is sealed in contact with an inner circumferential surface of the inner tube.

12. The syringe according to claim 1, further comprising a gas inlet penetrating a side wall of the body and communicating with the fillable space so that the first fluid is filled into the fillable space.

13. The syringe according to claim 1, wherein a guide portion is formed on a sidewall of the body.

14. The syringe according to claim 13, wherein a front end of the needle comprises a cut surface that is cut obliquely in one direction, and the cut surface is formed to face upward while the body is coupled to an actuator.

* * * * *